(12) United States Patent
Tai

(10) Patent No.: US 8,336,578 B2
(45) Date of Patent: Dec. 25, 2012

(54) QUICK RELEASE GAS PRESSURE REGULATOR

(76) Inventor: Su-Hua Tai, Taoyuan County (TW)

( * ) Notice: Subject to any disclaimer, the term of this patent is extended or adjusted under 35 U.S.C. 154(b) by 416 days.

(21) Appl. No.: 12/773,175

(22) Filed: May 4, 2010

(65) Prior Publication Data

US 2011/0272040 A1    Nov. 10, 2011

(51) Int. Cl.
*F16K 43/00* (2006.01)
*G05D 16/18* (2006.01)

(52) U.S. Cl. ............... 137/613; 137/116.5; 137/315.04; 137/505.11

(58) Field of Classification Search .................. 137/613, 137/116.5, 315.04, 505.11
See application file for complete search history.

(56) References Cited

U.S. PATENT DOCUMENTS

| | | | | |
|---|---|---|---|---|
| 2,666,278 A | * | 1/1954 | Matasovic | 137/505.42 |
| 3,250,292 A | * | 5/1966 | Mollick | 137/505.28 |
| 3,665,956 A | * | 5/1972 | Hammon | 137/505.11 |
| 6,009,900 A | * | 1/2000 | Elgert et al. | 137/613 |
| 6,907,900 B2 | * | 6/2005 | Markham et al. | 137/613 |
| 7,798,169 B2 | * | 9/2010 | Tai | 137/613 |

* cited by examiner

*Primary Examiner* — Kevin Lee
(74) *Attorney, Agent, or Firm* — Rosenberg, Klein & Lee

(57) ABSTRACT

A quick release gas pressure regulator having a primary pressure zone, a secondary pressure zone, and a gas bottle connection zone within the main body. A pressure-regulating device is positioned within the secondary pressure zone of the main body. A gas chamber sealing plug is disposed at the front portion of the first pressure chamber of the main body. An external axial pressure relief passage is formed at the gas chamber plug. A positioning ring seat includes an internal axial pressure relief passage communicating with the external axial pressure relief passage. A pressure relief O-ring is positioned at the joint between the internal axial pressure relief passage and the external axial pressure relief passage. A gas supply back-up post is divided by the pressure relief O-ring into a sealing portion and a pressure relief portion. A pushing member radially passes through the main body and the positioning ring seat, and having a pushing inclination facing the internal end of the gas supply back-up post. A return spring is positioned at the internal end portion of the pushing member. An operating lever is pivotally connected to the main body. The operating lever includes a cam portion facing the external end of the pushing member. In this way, an easy detachment and an improved use safety are achieved.

8 Claims, 6 Drawing Sheets

QUICK RELEASE GAS PRESSURE REGULATOR

BACKGROUND OF THE INVENTION

1. Field of the Invention

The invention relates to a quick release gas pressure regulator, and more particularly to a gas pressure regulator that permits an easy connection to the gas source and a convenient disconnection for escaping the remaining gas only by moving the operating lever in an open or a close position. Thus, an extraordinary wear of the connection thread is avoided for an easy detachment and for an improved use safety.

2. Description of the Related Art

Gas, such as oxygen, acetylene, nitrogen, argon and the like has to be pressurized before bottling for use in the industries. However, the pressure of these bottled high-pressure gases must be adjusted by a gas pressure regulator to a proper level before use in order to ensure the safety in use of the pipe apparatus, tools or related equipment. Generally, the high-pressure gas is still present in the pressure pipes connected within and outside the gas pressure regulator when the high-pressure gas bottles are replaced. Therefore, the connection threads attached to the high-pressure gas bottle are subject to an external thrust created by the high-pressure gas. In other words, a great friction force acts on the connection threads during the replacement of the high-pressure gas bottle, thereby causing a rapid wear of the connection thread in an extraordinary way. Accordingly, the gas pressure regulator is not easy to be removed. In some cases, a blowout gas can be even produced in dismantling the gas pressure regulator. As a result, some components cannot be normally activated. Moreover, the personnel and the equipment can be seriously endangered.

SUMMARY OF THE INVENTION

An object of the invention is to provide a quick release gas pressure regulator that escapes the high pressure gas remaining inside first to prevent the connection thread from an extraordinary wear. In this way, an easy detachment and an improved use safety are achieved.

In order to achieve the above-mentioned objects, the invention includes:

a) a main body divided into a primary pressure zone at the central portion thereof, a secondary pressure zone at the front portion thereof, and a gas bottle connection zone at the rear portion thereof, the primary pressure zone and the secondary pressure zone being separated by a radial flange, the radial flange having a pressure-regulating passage in the axial direction, an gas supply passage being interposed between the primary pressure zone and the gas bottle connection zone with a gas outlet facing the secondary pressure zone;

b) a pressure-regulating device positioned within the front portion of the main body;

c) a gas chamber sealing plug positioned at the front portion of the primary pressure zone of the main body in proximity to the gas supply passage of the main body, a first pressure chamber being defined by the gas chamber sealing plug and the radial flange; and d) a pressure relief unit positioned within the middle portion of the main body and having:

i) a gas chamber plug positioned at the rear portion of the primary pressure zone of the main body, the gas bottle connection zone of the main body being provided with a connection thread in connection with a gas bottle connector, a gas supply chamber being defined by the gas chamber plug and the gas bottle connector, the gas chamber plug having an external axial pressure relief passage;

ii) a positioning ring seat fixed by the gas chamber plug at the central portion of the primary pressure zone of the main body and having an internal axial pressure relief passage communicating with the external axial pressure relief passage, a pressure relief O-ring being positioned at the joint between the internal axial pressure relief passage and the external axial pressure relief passage;

iii) a gas supply back-up post received within the external axial pressure relief passage and the internal axial pressure relief passage, the gas supply back-up post being divided into a sealing portion and with a pressure relief portion by the pressure relief O-ring;

iv) a pushing member radially passing through the main body and the positioning ring seat, and having a pushing inclination facing the internal end of the gas supply back-up post, a return spring being positioned at the internal end portion of the pushing member; and v) an operating lever pivotally connected to the main body by a pivot, the operating lever having a cam portion facing the external end of the pushing member.

According to the invention, the pressure-regulating device further includes:

a) a pressure-regulating piston positioned within the secondary pressure zone of the main body, a secondary pressure chamber being defined by the pressure-regulating piston and the radial flange;

b) a pressure regulator mounted at the front end of the main body;

c) an external pressure balancing spring biased between the pressure-regulating piston and the pressure regulator;

d) an internal pressure balancing spring biased between the pressure-regulating piston and the radial flange of the main body; and e) a pressure control bolt passing through the pressure-regulating passage of the main body and fitting into the pressure-regulating piston, the pressure control bolt having a plug within the primary pressure zone for controlling the opening size of the pressure-regulating passage.

BRIEF DESCRIPTION OF THE DRAWINGS

The accomplishment of this and other objects of the invention will become apparent from the following descriptions and its accompanying figures of which.

DETAILED DESCRIPTION OF THE PREFERRED EMBODIMENT

Figure 1:
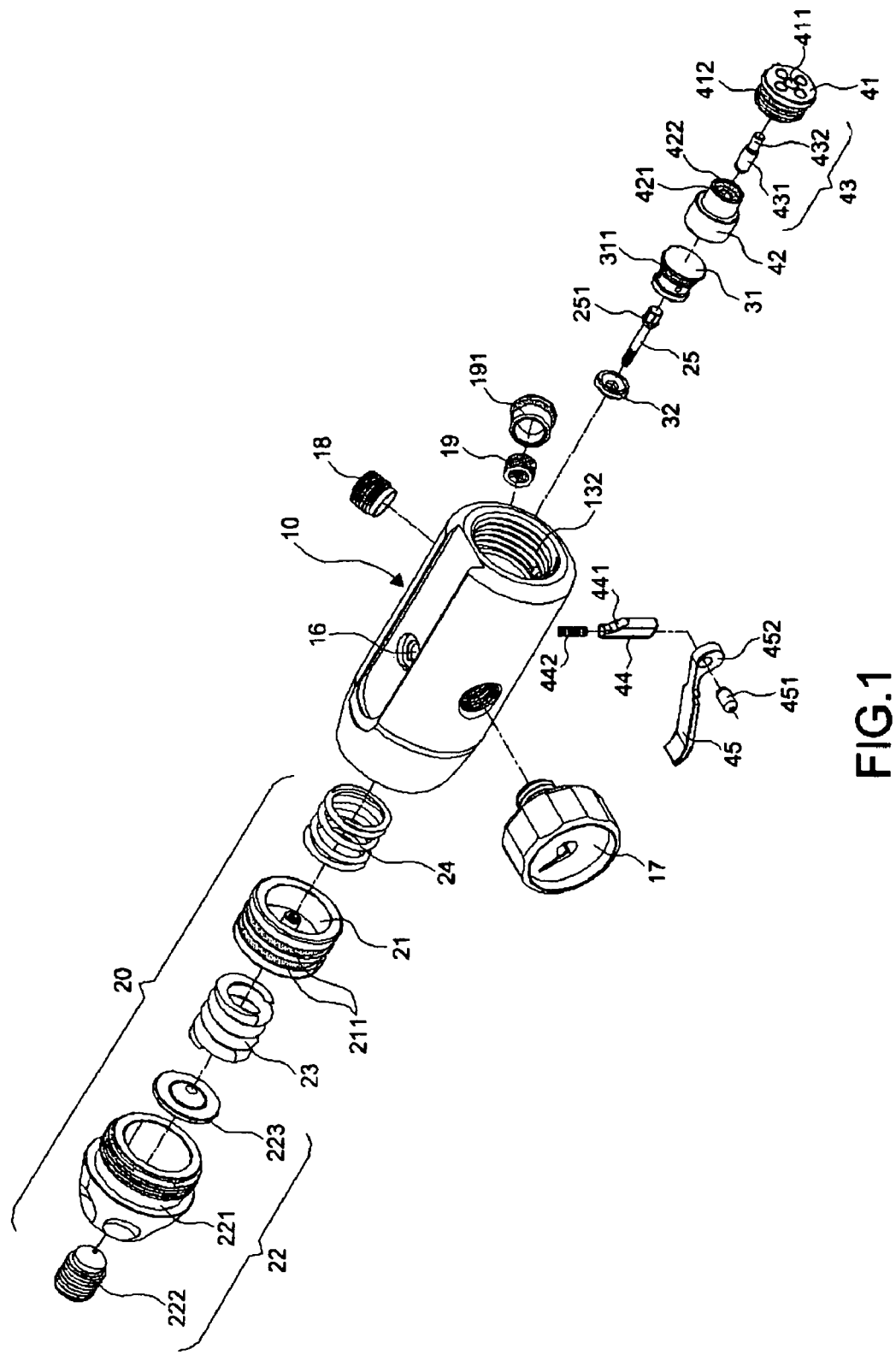
FIG. 1 is an exploded perspective view of the structure of the invention.
Figure 2:
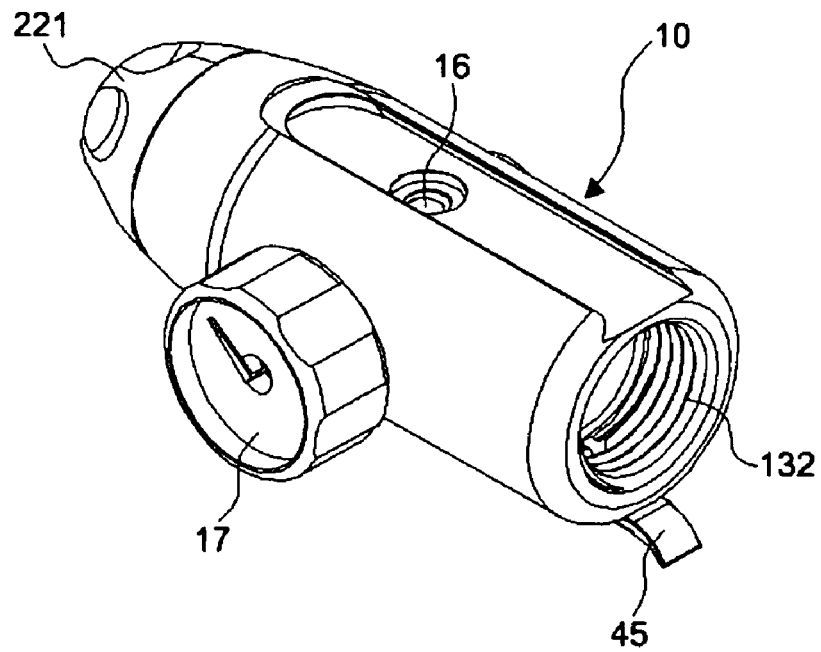
FIG. 2 is a perspective view of the structure of the invention.
Figure 3:
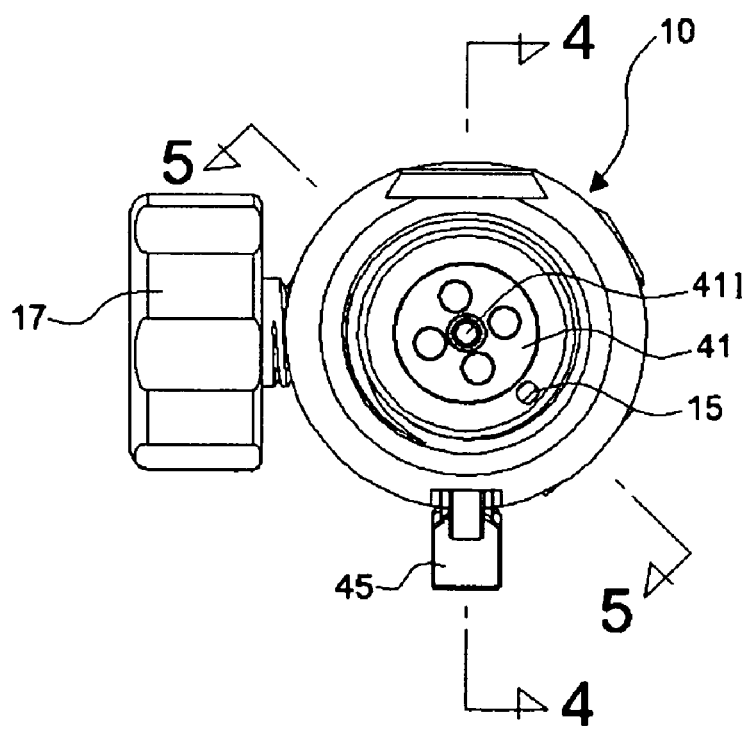
FIG. 3 is a side view of the structure of the invention.

First of all, referring to FIGS. 1 through 5, the invention includes a main body 10, a pressure-regulating device 20, a gas chamber sealing plug 31, and a pressure relief unit.

The main body 10 is divided into a primary pressure zone 11 at the central portion thereof, a secondary pressure zone 12 at the front portion thereof, and a gas bottle connection zone 13 at the rear portion thereof. The primary pressure zone 11 and the secondary pressure zone 12 are separated by a radial flange 14. The radial flange 14 includes a pressure-regulating passage 141 in the axial direction. A gas supply passage 15 is interposed between the primary pressure zone 11 and the gas bottle connection zone 13, and a gas outlet 16 is positioned in the wall of the secondary pressure zone 12. Moreover, a pressure gauge 17 and a safety valve 18 (or an end cap) are mounted at the secondary pressure zone 12. A strainer 19 is provided for the gas supply passage 15 and fastened with a positioning cock 191.

The pressure-regulating device 20 is positioned within the front portion of the main body 10 and includes a pressure-regulating piston 21, a pressure regulator 22, an external pressure balancing spring 23, and an internal pressure balancing spring 24, and a pressure control bolt 25. The pressure-regulating piston 21 is positioned within the secondary pressure zone 12 of the main body 10. A secondary pressure chamber 121 is defined by the pressure-regulating piston 21 and the radial flange 14. The pressure-regulating piston 21 is movable responsive to the pressure of the secondary pressure chamber 121. Meanwhile, an O-ring 211 is provided for ensuring a reliable gas tightness. The pressure regulator 22 includes a seal cap 221 mounted at the front end of the main body 10. The seal cap 221 includes a pressure-regulating screw 222 having a resting plate 223 at the inner end thereof. The external pressure balancing spring 23 is biased between the pressure-regulating piston 21 and the resting plate 223 of the pressure regulator 22 while the internal pressure balancing spring 24 is biased between the pressure-regulating piston 21 and the radial flange 14 of the main body 10. The pressure control bolt 25 passes through the pressure-regulating passage 141 of the main body 10 and fits into the pressure-regulating piston 21. The pressure control bolt 25 includes a plug 251 within the primary pressure zone 11 for controlling the opening size of the pressure-regulating passage 141.

The gas chamber sealing plug 31 is positioned at the front portion of the primary pressure zone 11 of the main body 10 in proximity to the gas supply passage 15 of the main body 10. A first pressure chamber 111 is defined by the gas chamber sealing plug 31 and the radial flange 14. Meanwhile, an O-ring 311 is provided for ensuring a reliable gas tightness. Moreover, an elastic washer 32 is interposed between the gas chamber sealing plug 31 and the radial flange 14 for enhancing the gas tightness when the pressure-regulating passage 141 is closed by the pressure control bolt 25.

The pressure relief unit is positioned within the middle portion of the main body 10 and includes a gas chamber plug 41, a positioning ring seat 42, a gas supply back-up post 43, a pushing member 44, and an operating lever 45. The gas chamber plug 41 is positioned at the rear portion of the primary pressure zone 11 of the main body 10. The gas bottle connection zone 13 of the main body 10 is provided with a connection thread 132 in connection with a gas bottle connector 50 (or the gas bottle). A gas supply chamber 131 is defined by the gas chamber plug 41 and the gas bottle connector 50. Moreover, the gas chamber plug 41 includes an external axial pressure relief passage 411 while an O-ring 412 is provided for ensuring a reliable gas tightness. The positioning ring seat 42 is fixed by the gas chamber plug 41 at the central portion of the primary pressure zone 11 of the main body 10. The positioning ring seat 42 includes an internal axial pressure relief passage 421 communicating with the external axial pressure relief passage 411. A pressure relief O-ring 422 is positioned at the joint between the internal axial pressure relief passage 421 and the external axial pressure relief passage 411. The gas supply back-up post 43 is received within the external axial pressure relief passage 411 and the internal axial pressure relief passage 421. The gas supply back-up post 43 is divided by the pressure relief O-ring 422 into (internally) a sealing portion 431 having a larger diameter and (externally) a pressure relief portion 432 having a smaller diameter. The pushing member 44 radially passes through the main body 10 and the positioning ring seat 42, and includes a pushing inclination 441 facing the internal end of the gas supply back-up post 43. A return spring 442 is positioned at the internal end portion of the pushing member 44. A pivot 451 is provided for pivotally connecting the operating lever 45 to the main body 10. The operating lever 45 includes a cam portion 452 facing the external end of the pushing member 44.

Figure 4:
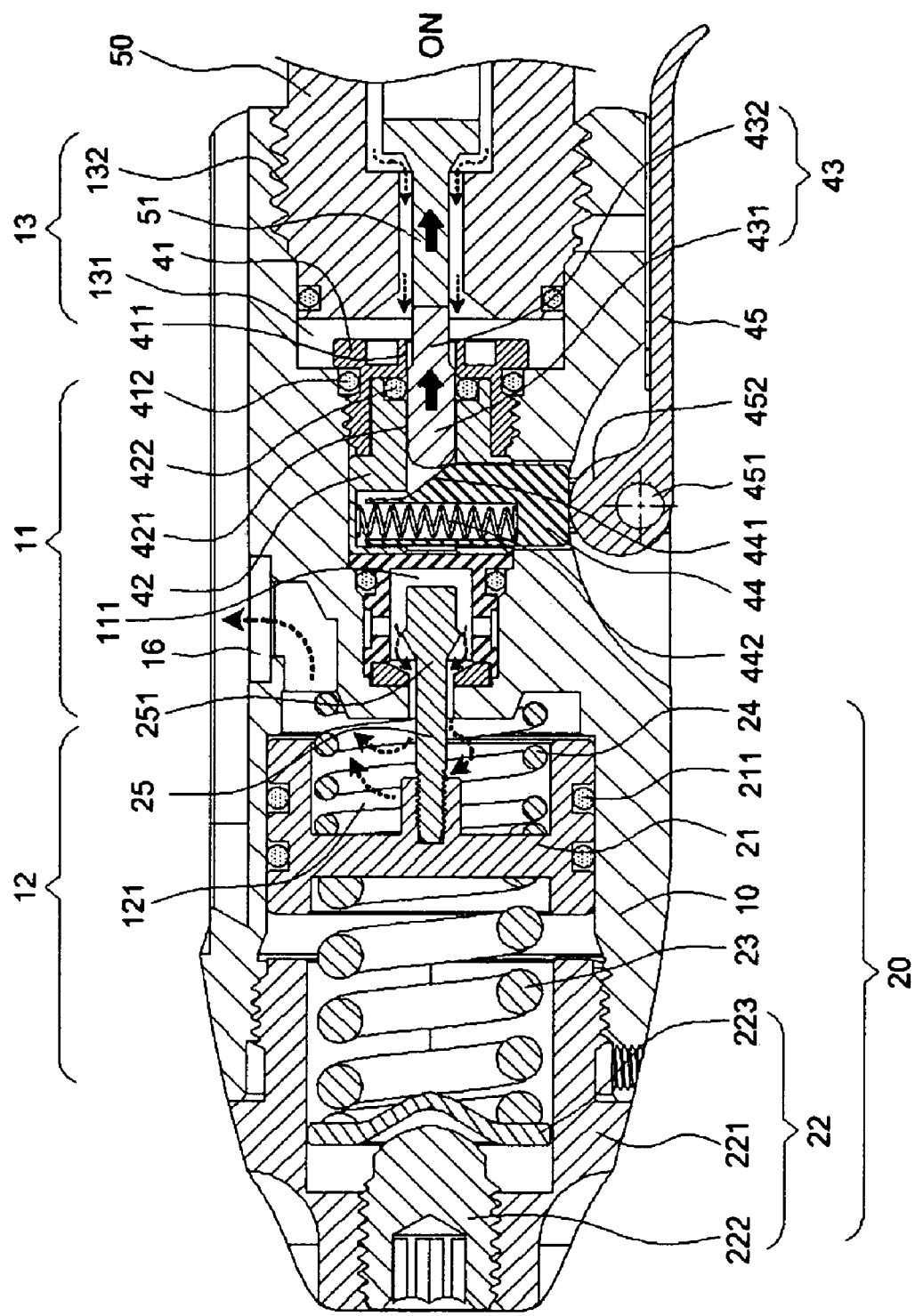
FIG. 4 is a cross-sectional view taken along the line 4-4 in FIG. 3.
Figure 5:
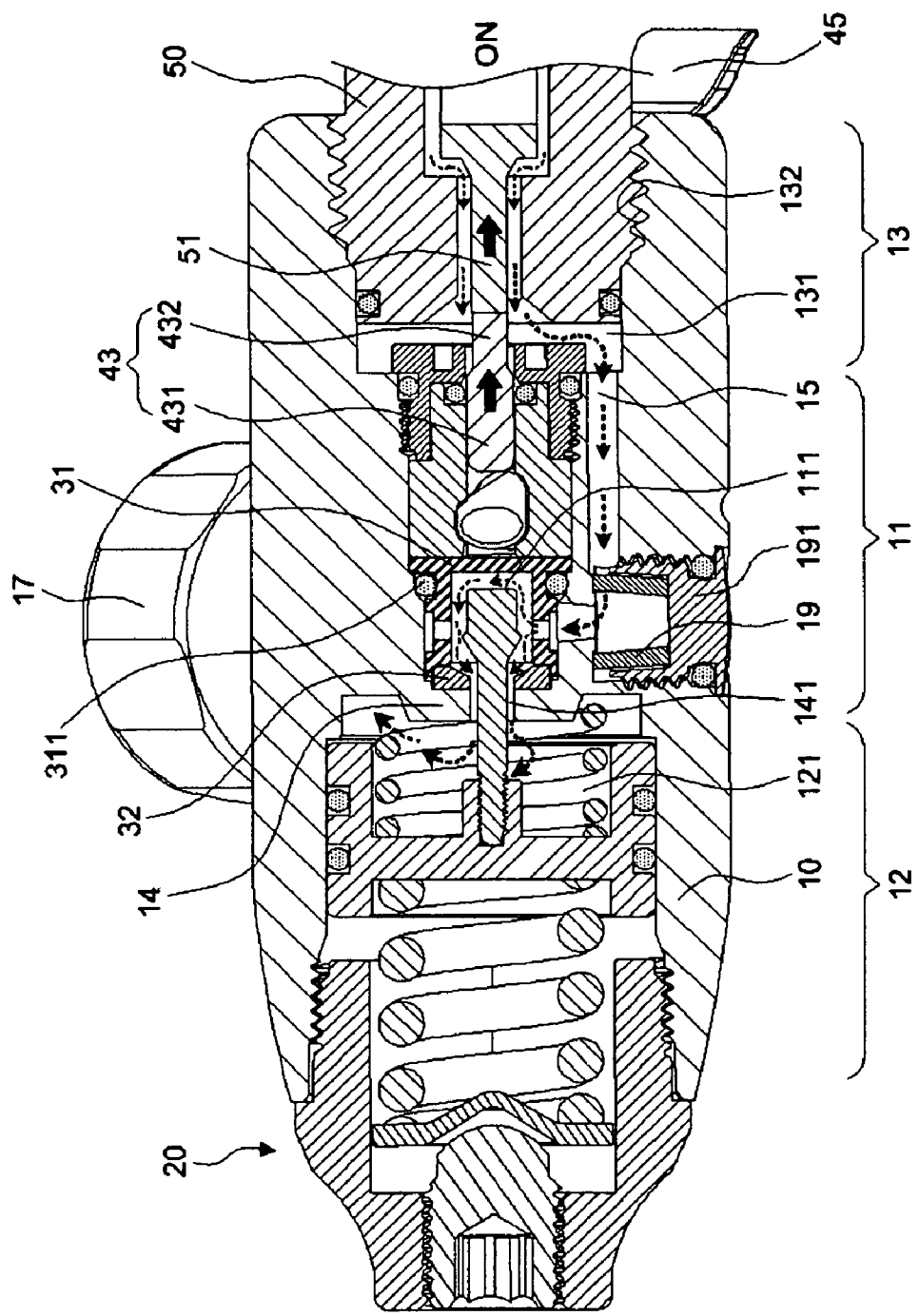
FIG. 5 is a cross-sectional view taken along the line 5-5 in FIG. 3.

Please refer to FIGS. 4 and 5. When the operating lever 45 is moved to a position where the cam portion 452 of the operating lever 45 pushes the pushing member 44 inward, the gas supply back-up post 43 will be pushed outward by the pushing inclination 441 of the pushing member 44. In this way, the sealing portion 431 having a larger diameter is moved to the position of the pressure relief O-ring 422 to achieve the gas tightness. Moreover, the gas supply valve 51 in the gas bottle connector 50 is moved inward in an open (ON) position such that the high pressure gas is injected from the gas supply chamber 131 through the gas supply passage 15 into the first pressure chamber 111. Thereafter, the high pressure gas passes through the pressure-regulating passage 141 and enters the secondary pressure chamber 121 for regulating the pressure. Finally, the high pressure gas leaves the main body 10 by the gas outlet 16 for use.

Figure 6:
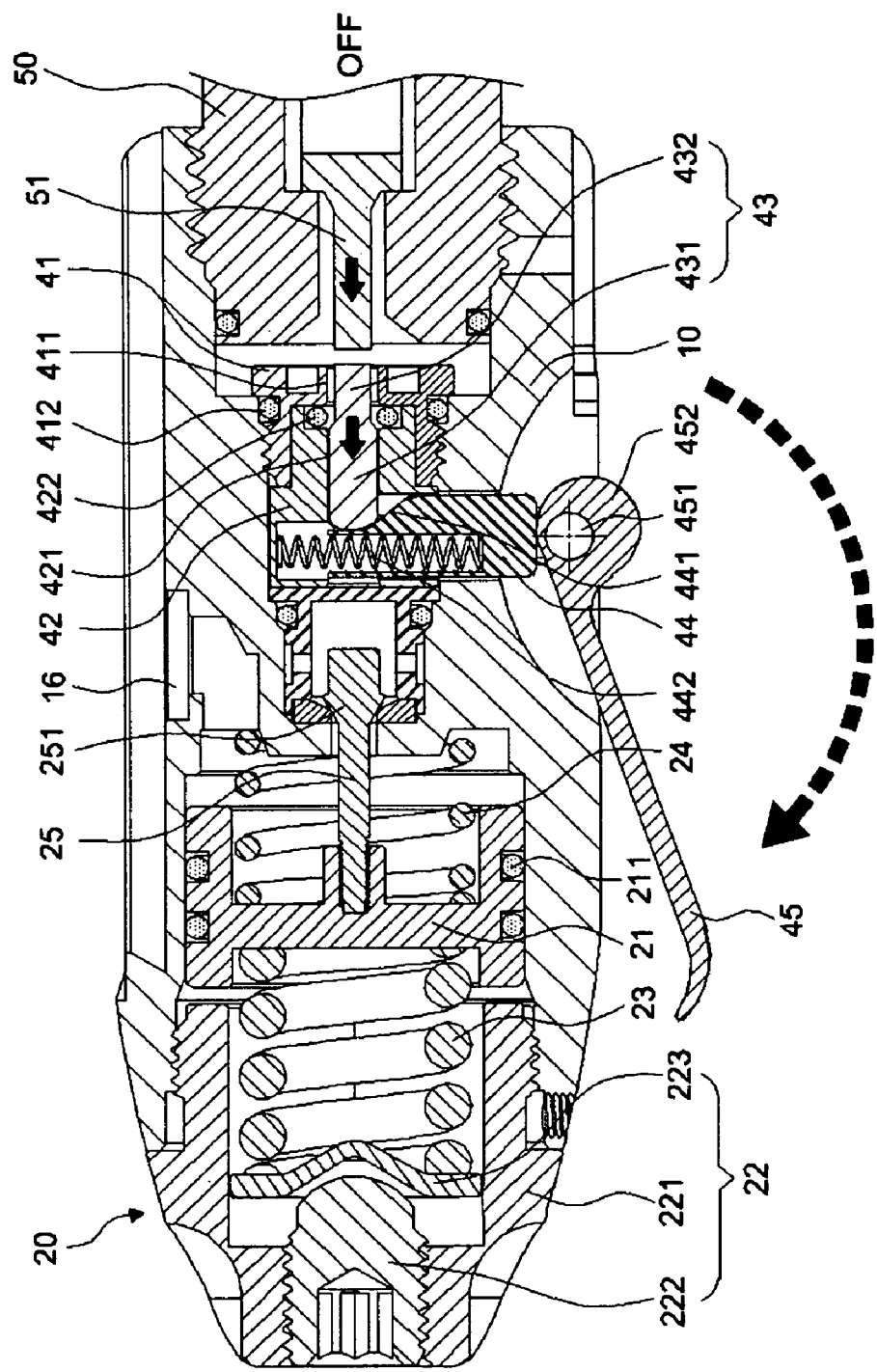
FIG. 6 is a cross-sectional view according to FIG. 4, showing that the operating lever is moved to extend the gas supply valve in a closed position.
Figure 7:
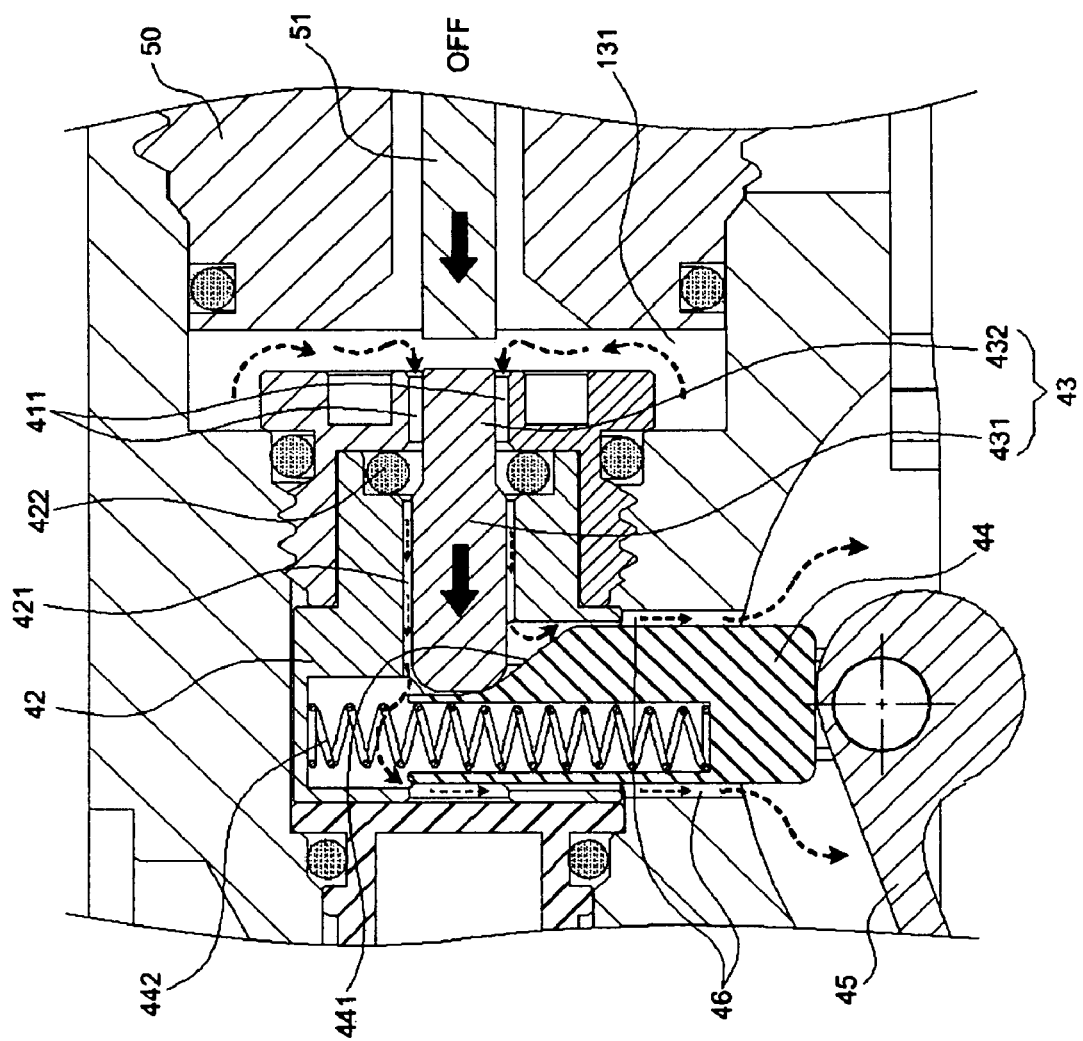
FIG. 7 is an enlarged section from FIG. 6.

For disconnection from the gas source, as shown in FIGS. 6 and 7, the operating lever 45 has to be moved to a position where the gas supply valve 51 is extended in a closed (OFF) position. Meanwhile, the pushing member 44 is not pushed by the cam portion 452 of the operating lever 45 any more. Moreover, the pushing member 44 will be pushed outward by the return spring 442 within the pushing member 44 such that the gas supply back-up post 43 is not subject to the pushing force produced by the pushing inclination 441 of the pushing member 44. As a result, the gas supply back-up post 43 may be pushed inward by the pressure of the gas remaining within the gas supply chamber 131 such that the pressure relief portion 432 having a smaller diameter is moved to the position of the pressure relief O-ring 422 for the purpose of the pressure relief. In this way, the gas remaining within the gas supply chamber 131 tends to flow through the external axial pressure relief passage 411, the internal axial pressure relief passage 421, and the gap 46 near the pushing member 44 in an escaping way to the outside.

Based on the above-mentioned structure, an easy connection to the gas source is ensured and a convenient disconnection for escaping the remaining gas is achieved only by moving the operating lever 45 in an open or a close position. Thus, an extraordinary wear of the connection thread is avoided for an easy detachment and for an improved use safety.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A quick release gas pressure regulator, comprising:
   a) a main body divided into a primary pressure zone at a central portion thereof, a secondary pressure zone at a front portion thereof, and a gas bottle connection zone at a rear portion thereof, the primary pressure zone and the secondary pressure zone being separated by a radial flange, the radial flange having a pressure-regulating passage in an axial direction, a gas supply passage being interposed between the primary pressure zone and the gas bottle connection zone, a gas outlet being positioned in a wall of the secondary pressure zone;

b) a pressure-regulating device positioned within the front portion of the main body;

c) a gas chamber sealing plug positioned at a front portion of the primary pressure zone of the main body in proximity to the gas supply passage of the main body, a first pressure chamber being defined by the gas chamber sealing plug and the radial flange; and d) a pressure relief unit positioned within a middle portion of the main body and having:

i) a gas chamber plug positioned at a rear portion of the primary pressure zone of the main body, the gas bottle connection zone of the main body being provided with a connection thread in connection with a gas bottle connector, a gas supply chamber being defined by the gas chamber plug and the gas bottle connector, the gas chamber plug having an external axial pressure relief passage;

ii) a positioning ring seat fixed by the gas chamber plug at a central portion of the primary pressure zone of the main body and having an internal axial pressure relief passage communicating with the external axial pressure relief passage, a pressure relief O-ring being positioned at a joint between the internal axial pressure relief passage and the external axial pressure relief passage;

iii) a gas supply back-up post received within the external axial pressure relief passage and the internal axial pressure relief passage, the gas supply back-up post being divided into a sealing portion and with a pressure relief portion by the pressure relief O-ring;

iv) a pushing member radially passing through the main body and the positioning ring seat, and having a pushing inclination facing the internal end of the gas supply back-up post, a return spring being positioned at an internal end portion of the pushing member; and v) an operating lever pivotally connected to the main body by a pivot, the operating lever having a cam portion facing the external end of the pushing member.

2. The quick release gas pressure regulator as recited in claim 1 wherein the pressure-regulating device includes:

a) a pressure-regulating piston positioned within the secondary pressure zone of the main body, a secondary pressure chamber being defined by the pressure-regulating piston and the radial flange;

b) a pressure regulator mounted at the front end of the main body;

c) an external pressure balancing spring biased between the pressure-regulating piston and the pressure regulator;

d) an internal pressure balancing spring biased between the pressure-regulating piston and the radial flange of the main body; and e) a pressure control bolt passing through the pressure-regulating passage of the main body and fitting into the pressure-regulating piston, the pressure control bolt having a plug within the primary pressure zone for controlling the opening size of the pressure-regulating passage.

3. The quick release gas pressure regulator as recited in claim 2 wherein the pressure regulator includes a seal cap mounted at the front end of the main body, and wherein the seal cap includes a pressure-regulating screw having a resting plate at an inner end thereof.

4. The quick release gas pressure regulator as recited in claim 3 wherein a strainer is provided for the gas supply passage and fastened with a positioning cock.

5. The quick release gas pressure regulator as recited in claim 3 wherein a pressure gauge and a safety valve are mounted at the secondary pressure zone.

6. The quick release gas pressure regulator as recited in claim 3 wherein an elastic washer is interposed between the gas chamber sealing plug and the radial flange.

7. The quick release gas pressure regulator as recited in claim 3 wherein the pressure-regulating valve, the gas chamber sealing plug, and the gas chamber plug include an O-ring, respectively, for ensuring a reliable gas tightness.

8. The quick release gas pressure regulator as recited in claim 3 wherein a pivot is provided for pivotally connecting the operating lever to the main body.

* * * * *